United States Patent [19]

Hedler

[11] 4,128,674

[45] Dec. 5, 1978

[54] METHOD OF MAKING PIGMENTED PHOSPHORS

[75] Inventor: Robert A. Hedler, Seneca Falls, N.Y.

[73] Assignee: GTE Sylvania Incorporated, Stamford, Conn.

[21] Appl. No.: 672,112

[22] Filed: Mar. 31, 1976

[51] Int. Cl.$^2$ .................... C09K 11/08; C09K 11/20; C09K 11/42

[52] U.S. Cl. .................... 427/218; 313/466; 428/403; 428/404; 428/407; 252/301.65; 427/68; 427/71; 427/219

[58] Field of Search .................... 252/301.65, 301.6 F; 260/29.6 H; 427/71, 73, 68, 219, 218; 428/407, 403, 404; 526/910

[56] References Cited

U.S. PATENT DOCUMENTS

| | | | |
|---|---|---|---|
| 2,909,444 | 10/1959 | Seats | 427/73 |
| 3,269,969 | 8/1966 | Fikentsher | 526/910 X |
| 3,684,731 | 8/1972 | Frey | 252/301.65 |
| 3,721,637 | 3/1973 | Schultz | 260/29.6 H X |
| 3,875,449 | 4/1975 | Byler | 252/301.65 X |
| 3,886,394 | 5/1975 | Lipp | 427/68 X |
| 4,020,231 | 4/1977 | Hedler et al. | 427/219 |

*Primary Examiner*—Sam Silverberg
*Attorney, Agent, or Firm*—William H. McNeill

[57] ABSTRACT

A pigmented phosphor comprises a core of a phosphor particle having a light modifying layer thereon. The light modifying layer is comprised of a co-precipitated mixture of silica or pyrophosphate and a pigment which modifies the light output of the energized phosphor. The phosphor is coated by first preparing an unique pigment stock suspension containing the pigment, water, and a polyacrylamide dispersant. The stock solution is then diluted and phosphor particles are added thereto and the mixture is vigorously stirred. The pH of the mixture can be adjusted to about 5 by the addition of acetic acid and then a small amount of positively charged colloidal silica or pyrophosphate is added. After mixing, the pH is raised to about 9 by the addition of a base or a salt which causes a gel to form and the silica or pyrophosphate and the pigment to co-precipitate out upon the phosphor particles.

8 Claims, No Drawings

METHOD OF MAKING PIGMENTED PHOSPHORS

BACKGROUND OF THE INVENTION

This invention relates to methods of coating phosphors and more particularly to methods of coating phosphors with a light modifying layer. These phosphors can be used, for example, on the image screen of the cathode ray tubes, in particular the image screen of color cathode ray tubes, in which case the light modifying layer also increases the contrast of the tube.

Phosphors are known classes of material which have the property of emitting radiation in the form of light when bombarded by a suitable form of energy such, for example, as the electron rays generated in a cathode ray tube.

In a color cathode ray the image screen is provided with a discrete pattern of phosphors emissive of the three primary colors red, green, and blue. As used generally in the art and particularly in this specification, a phosphor referred to by a color will mean the light emitted by the phosphor as opposed to its body color.

While it would be advantageous if these phosphors were line emitters, typically they are not. For example, a red phosphor will typically emit radiation over a frequency range wherein the net overall effect to a subjective observer will be red. However, there will be extraneous unwanted emission points and frequencies within the spectrum which may or may not detract from the overall perception of the phosphor. For example, some red phosphors have emission peaks within the orange portion of the spectrum which greatly enhance the brightness characteristics of the phosphor but tend to detract from the so called "ideal" red color desired.

The color cathode ray tube art has been aware of these problems for many years and frequent attempts have been made to obviate these problems. For example, it has been suggested that appropriate filters may be placed in front of the discrete phosphors to absorb or attenuate the undesired frequencies while passing the desired ones and enhancing the contrast. This approach has proven to be very expensive and very difficult to achieve. More recently it has been suggested to apply a filter material to the phosphor particles themselves. This approach has been detailed recently in such U.S. patents as U.S. Pat. Nos. 3,875,449; 3,308,326; and 3,886,394. Each of these prior patents discloses various means for accomplishing the application of a filter material to the phosphor particles. However, each of them is accompanied by difficulties in application and in uniformity or in the agglomeration of the phosphor particles which makes them difficult to apply to the screen area of a cathode ray tube.

It would therefore be an advance in the art if means of obviating the problems of the prior art could be accomplished.

OBJECTS AND SUMMARY OF THE INVENTION

It is therefore an object of this invention to obviate the disadvantages of the prior art.

It is yet another object of this invention to provide an uniquely pigmented phosphor having an appropriate color filter applied thereto.

It is yet another object of the invention to provide a method for making such phosphors.

Still another object of the invention is the provision of a method of making free-flowing pigmented phosphors.

These objects are accomplished in one aspect of the invention by providing a composite article which has a core of a phosphor particle having the capability of emitting light in a relatively narrow frequency band which contains a preferred frequency and other frequencies. The core of the particle is encapsulated by a light modifying layer which layer comprises a co-precipitated mixture of silica or pyrophosphates and a pigment. The pigment is substantially opaque to light of the other frequencies.

A method of making these free-flowing pigmented phosphors comprises the steps of preparing an aqueous mixture of particles of phosphors, particles of a pigment, a positively charged colloidal silica or pyrophosphate and a polyacrylamide dispersant. This mixture is mixed thoroughly under continued agitation. Then, a base or a salt in a sufficient amount to gel the mixture and initiate precipitation is added. As the mixture gels, the silica or pyrophosphates and pigment are co-precipitated out on and coat the phosphor particles. After a sufficient period of time to allow coating, the phosphor settles out and the supernatant liquid is removed. Thereafter the phosphor is dried.

This unique process provides a novel pigmented phosphor. The light modifying layer which is comprised of a co-precipitated silica and pigment provides a very free-flowing non-agglomerated phosphor. The use of the polyacrylamide dispersant greatly enhances the homogeneity of the coating. The method is relatively simple and inexpensive to employ and provides this unique phosphor in a scale well suited to the mass production techniques of the industry.

DESCRIPTION OF THE PREFERRED EMBODIMENTS

For a better understanding of the present invention together with other and further objects, advantages, and capabilities thereof, reference is made to the following disclosure and appended claims.

Referring to the invention with greater particularity, a composition article comprises a core of a phosphor particle which has the capability of emitting light in a relatively narrow frequency band which contains a preferred frequency and other frequencies. The light emission from the particle is stimulated by bombardment with a suitable form of energy. This energy can be ultraviolet radiation or electron stimulation from a beam of electrons, such as is employed in a cathode ray tube. The phosphor can be any of the commercially employed phosphors such as those commonly known as the red, green, and blue emitting phosphors employed in color cathode ray tubes. The core or phosphor particle is encapsulated by a light modifying layer. This layer is composed of a co-precipitated mixture of a material selected from the group consisting essentially of silica and pyrophosphates and a pigment which is substantially transparent to light of the preferred phosphor frequency and a substantially opaque to light of the other emitted frequencies.

The pigment material itself can be selected from any of the known suitable pigmentation materials. For example, a suitable pigment for a red emitting phosphor can be a cadmium sulfoselenide or a ferric oxide ($Fe_2O_3$). When it is desired to apply a pigment to a blue phosphor, materials such as commercial cobalt blues or ultramarine blue can be employed. When the phosphor being worked upon is a green emitting phosphor a chromium oxide ($Cr_2O_3$) or commercial cobalt chrome greens can be employed.

While there are a number of silica or pyrophosphate compounds that could be employed it has been found that a positively charged medium provides a tremendous advance in the art. A suitable positively charged colloidal silica has been found to be Ludox 130M which is available from the Dupont Corporation. This positively charged colloidal silica readily adheres to the phosphor core and carries with it the desired pigment in a process characterized by co-precipitation of the silica and pigment upon the phosphor.

The phosphor thus produced has all of the advantages of pigmented phosphors in addition to being provided with the desirable free-flowing characteristics necessary to its proper application on the face plate of a cathode ray tube.

These free-flowing phosphors having pigments thereon are prepared as follows: A pigment stock suspension is prepared by forming a first suspension of pigment and a sufficient amount of water and mixing to form a suitable dispersion having the consistency of a thick paste. To this first suspension is added a polyacrylamide, such as American Cyanamid's Cyanamer P-35, to form a second suspension. The second suspension is then diluted with water to form the pigment stock suspension. A preferable stock suspension contains about 20% pigment.

To coat a phosphor (for example, to a 5% pigment level) a quantity of stock suspension is diluted about 8:1 with water, the phosphor is added and the mixture is stirred vigorously. To avoid unwanted premature precipitation, the phosphor-stock suspension mixture should be maintained with an acidic pH of about 5. To this end the pH can be adjusted to this point by the addition of a suitable dilute acid. Any acid that will not react with the precipitation products is suitable, and a 10% acetic acid solution performs well.

With the mixture stabilized, a small quantity of a positively charged colloidal silica is added and thoroughly stirred into the mixture. The pH is then raised to about 9.0 by the addition of a base, such as a 3% ammonium hydroxide solution which causes a gelling to take place and initiating the co-precipitation of the silica and pigment upon the phosphor. The mixture is stirred for a suitable period of time to allow coating and then the coated phosphor and remaining liquid are separated, as by filtering, and the phosphor is dried. The phosphor is now ready for use in a screening operation.

When the procedure above is employed, but it is desired to use a pyrophosphate rather than the silica, a salt which will form an insoluble pyrophosphate is used in place of the base. Such a salt, for example, can be magnesium chloride.

As a specific, but non-limiting example, the following small scale coating procedure is exemplified, it being apparent that the proportions employed can be scaled up to a larger operation.

In a half pint ball mill, which can contain suitable milling stones, such as Borundum cylinders, place 50 gms of a suitable pigment, for example, General Color Corp., Red Toner #2010 (cadmium sulfoselenide). A minimum amount of water (approximately 65 ml) is added to form a thick paste and obtain a first suspension. The first suspension is milled for from about 6 to about 24 hours. Next, about 0.5 gms of polyacrylamide dispersant in water is added and the milling is continued for about 12 to 24 hours. Thereafter, dilution with water to about 250 ml total volume yields a 20% pigment stock solution.

To coat 100 gms of a red phosphor, e.g., a yttrium oxide, europium activated, to a 5% pigment level, 25 ml of pigment stock solution is diluted to 200 ml with water. The phosphor is added and the mixtures stirred vigorously. To be certain that premature precipitation does not take place, the phosphor-pigment mixture is maintained with an acidic pH of about 5. This can be accomplished by the addition of a necessary amount of a 10% acetic acid solution. Thereafter, the positively charged colloidal silica or pyrophosphate is added, for example, 1.1 ml of the aforementioned Ludox 130M. The new mixture is stirred for about 10 minutes and then the pH is adjusted to about 9 by the addition of a base, such as a 3% ammonium hydroxide solution. The ammonium hydroxide causes the mixture to gel and starts the co-precipitation of the silica and pigment. The mixture is stirred for 10 minutes or until the completion of the reaction and then the coated phosphor is filtered to remove the liquid and dried at about 130° C.

This process provides an unique, free-flowing, pigmented phosphor which screens easily, particularly when a dry deposition technique, such as that shown in U.S. Pat. No. 3,025,161 is employed.

The ratio of pigment to phosphor can be varied to obtain the desired coloration and the pigment coating can range from 1% to about 10% by weight of the phosphor, it being remembered that the greater the coating thickness, the more the brightness of the phosphor is reduced.

The ratio of polyacrylamide to pigment can also be varied from about 0.1% to 5% by weight with the preferred range being from 0.5% to 1.5%.

Likewise, the ratio of silica to phosphor can be between 0.05% and 5% for the desired screening characteristics.

It shall be understood that any coating procedure of this type wherein a material is applied to a phosphor will inherently reduce the brightness of the phosphor to some extent. In all coating procedures of this type the amount of material to be deposited will of necessity be a subjective determination of how much color enhancement is desired at what penalty of brightness loss. The size of the materials being employed will also have a bearing upon this. It has been found that when the phosphor particles have an average size of 6 to 7 microns, then a suitable coating can be achieved using filter particles having diameters up to 1 micron.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A method of making free-flowing, pigmented phosphors comprising the steps of: diluting with water a 20% pigment stock suspension containing a polyacrylamide; adding phosphor particles and agitating vigorously; adjusting the pH to about 5.0 by adding a 10% acetic acid solution; adding a small amount of a positively charged colloidal silica with constant stirring; adding a base to raise the pH to about 9; stirring for a suitable time to allow said silica and said pigment to co-precipitate upon said phosphor particles; and removing the remaining liquid and drying said phosphor particles; and removing the remaining liquid and drying said phosphor particles.

2. The method of claim 1 wherein said constant stirring occurs for about 10 minutes.

3. The method of claim 2 wherein said suitable time is about 10 minutes.

4. The method of claim 3 wherein said base is ammonium hydroxide.

5. The method of claim 4 wherein said ammonium hydroxide is a 3% solution.

6. The method of claim 5 wherein said phosphor is dried at about 130° C.

7. A method of making free-flowing pigmented phosphors comprising the steps of: diluting with water a 20% pigment stock suspension containing a polyacrylamide; adding phosphor particles and agitating vigorously; adjusting the pH to about 5; adding a pyrophosphate; adding a salt which will form an insoluble pyrophosphate to cause precipitation; stirring for a suitable time to allow said pyrophosphate and said pigment to co-precipitate upon said phosphor particles; and removing the remaing liquid and drying said phosphor.

8. The method of claim 7 wherein said salt is magnesium chloride.